United States Patent [19]

Lin

[11] Patent Number: 5,528,632
[45] Date of Patent: Jun. 18, 1996

[54] NON-COMPLEX DUAL-CORRELATION PHASE REVERSAL DETECTOR AND METHOD

[75] Inventor: Jingdong Lin, Norwood, Mass.

[73] Assignee: Motorola, Inc., Schaumburg, Ill.

[21] Appl. No.: 282,186

[22] Filed: Jul. 28, 1994

[51] Int. Cl.$^6$ ............................. H04L 27/22; H04L 27/06
[52] U.S. Cl. ............................................. 375/324; 375/343
[58] Field of Search ..................................... 375/324, 340, 375/343, 208, 329, 330, 333; 395/2.25, 2.22; 364/728.03; 329/304

[56] References Cited

U.S. PATENT DOCUMENTS

| | | | |
|---|---|---|---|
| 5,012,491 | 4/1991 | Iwasaki | 375/343 |
| 5,068,876 | 11/1991 | Yoshikawa et al. | 375/324 |
| 5,195,108 | 3/1993 | Baum et al. | 375/343 |
| 5,267,264 | 11/1993 | Shlenker et al. | 375/343 |

*Primary Examiner*—Stephen Chin
*Assistant Examiner*—Hai H. Phan
*Attorney, Agent, or Firm*—Darleen J. Stockley

[57] ABSTRACT

A simplified transition detector identifies phase reversal without relying upon complex correlation relationships or trellis techniques. Two correlation signals are obtained using tones with a phase difference of $\pi/2$. Zero-crossing information on the two correlation signals is used to detect phase reversal.

6 Claims, 2 Drawing Sheets

FIG.3 300

302 — GENERATING, BY A TONE GENERATOR, TWO PREDETERMINED TONES WITH A PHASE DIFFERENCE OF $\pi/2$

304 — UTILIZING FIRST AND SECOND CORRELATORS FOR PROVIDING A FIRST AND A SECOND CORRELATION SIGNAL, RESPECTIVELY

306 — UTILIZING FIRST AND SECOND ZERO-CROSSING DETECTORS FOR DETERMINING A ZERO-CROSSING FOR THE FIRST AND SECOND CORRELATION SIGNALS, RESPECTIVELY

308 — UTILIZING A DECISION UNIT FOR DETECTING PHASE REVERSAL WHEN, UPON ONE CORRELATION SIGNAL HAVING A FIRST ZERO-CROSSING, THE OTHER CORRELATION SIGNAL HAS A ZERO-CROSSING WITHIN A PREDETERMINED TIME INTERVAL FROM THE FIRST ZERO-CROSSING

FIG.4 400

402 — DETERMINING THE FIRST CORRELATION SIGNAL BY UTILIZING A FIRST MULTIPLIER FOR MULTIPLYING THE RECEIVED SIGNAL AND THE FIRST PREDETERMINED TONE TO PROVIDE FIRST PRODUCT SIGNALS AND UTILIZING A FIRST SUMMER FOR SUMMING A PREDETERMINED NUMBER OF FIRST PRODUCT SIGNALS TO PROVIDE THE FIRST CORRELATION SIGNAL

404 — DETERMINING THE SECOND CORRELATION SIGNAL BY UTILIZING A SECOND MULTIPLIER FOR MULTIPLYING THE RECEIVED SIGNAL AND THE SECOND PREDETERMINED TONE TO PROVIDE SECOND PRODUCT SIGNALS AND UTILIZING A SECOND SUMMER FOR SUMMING A PREDETERMINED NUMBER OF SECOND PRODUCT SIGNALS TO PROVIDE THE SECOND CORRELATION SIGNAL

NON-COMPLEX DUAL-CORRELATION PHASE REVERSAL DETECTOR AND METHOD

FIELD OF THE INVENTION

This invention relates generally to data communications, and more particularly, to detecting phase transition of signals in data communications.

BACKGROUND

Typically, in modem communications, a tone with 180 degree phase reversal and a period following this transition to allow reliable detection of the reversal, is used to signal the other side the presence of an event, for example, detection of DPSK sequence, beginning of line probing signal, finishing of channel analysis, beginning and ending of round trip delay measurement timer, and so on.

The timing of the transition must be measured precisely to allow the receiver to be set correctly. Some transition detectors that are known in the art utilize complex coherent schemes to give a highest correlation between locally generated tones and the received signal. Other transition detectors utilize trellis techniques based on known subsequences of symbols that preceded and followed a transition. Thus, there is a need for a non-complex phase reversal detector and method that simplifies transition detection.

BRIEF DESCRIPTION OF THE DRAWINGS

FIG. 3 is a flow chart showing steps of a dual-correlation phase reversal detection method for determining phase reversal in a received signal in accordance with the present invention.

FIG. 4 is a flow chart showing the steps of determining the first and second correlation signals of FIG. 3 with greater particularity.

DETAILED DESCRIPTION OF A PREFERRED EMBODIMENT

The present invention provides a simplified transition detector that identifies phase reversal without relying upon complex coherent correlation or trellis techniques. Instead, the present invention provides dual correlation signals using tones with a phase difference of $\pi/2$ and uses zero-crossing information on the two correlation signals to detect phase reversal, and works reliably with a signal-to-noise ratio as low as 6 dB and is immune to a phase shift up to 7 Hz.

Figure 1:
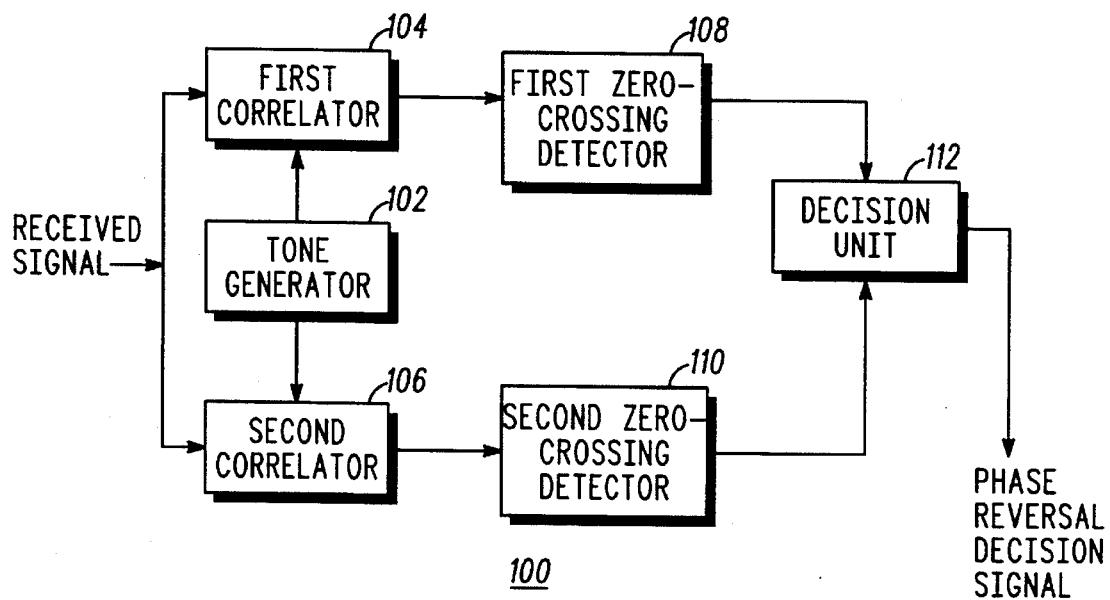
FIG. 1 is a block diagram of a dual-correlation phase reversal detector for determining phase reversal in a received signal in accordance with the present invention.

FIG. 1, numeral 100, is a block diagram of a dual-correlation phase reversal detector for determining phase reversal in a received signal in accordance with the present invention. A) a tone generator (102) for generating a first predetermined tone and a second predetermined tone with a phase difference of $\pi/2$ from the phase of the first tone; B) first and second correlators (104, 106), each operably coupled to receive the received signal and to the tone generator, for each utilizing the received signal and one of the first and second predetermined tones to provide a first and a second correlation signal, respectively; C) first and second zero-crossing detectors (108, 110), operably coupled to the first and second correlators, respectively, for determining a zero-crossing for the first and second correlation signals, respectively; and D) a decision unit (112), operably coupled to the first and second zero-crossing detectors, for detecting phase reversal when, upon one correlation signal having a first zero crossing, the other correlation signal having a zero crossing within a predetermined time interval from the first zero crossing.

Figure 2:
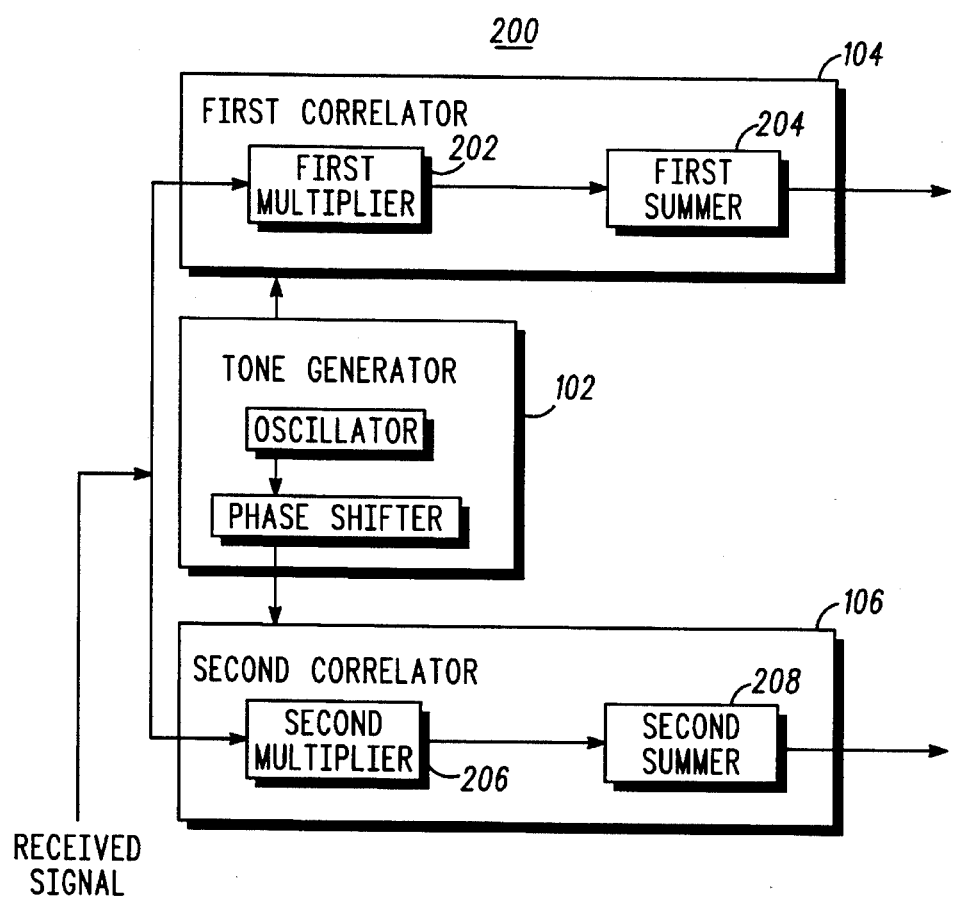
FIG. 2 is a block diagram showing the first and second correlators and the tone generator of FIG. 1 with greater particularity.

As shown with greater particularity in FIG. 2, numeral 200, the first correlator (104) typically includes a first multiplier (202) and first summer (204). The first multiplier (202) is operably coupled to the tone generator (102) and to receive the received signal and is used for multiplying the received signal and the first predetermined tone to provide first product signals. The first summer (204) is operably coupled to the first multiplier (202) and is used for summing a predetermined number (usually one period) of first product signals to provide the first correlation signal. The second correlator (106) typically includes a second multiplier (206) and a second summer (208). The second multiplier (206) is operably coupled to the tone generator (102) and to receive the received signal and is used for multiplying the received signal and the second predetermined tone to provide second product signals. The second summer (208) is operably coupled to the second multiplier (206) and is used for summing a predetermined number (usually one period) of second product signals to provide the second correlation signal. Each of the first and second correlators (104, 106) generally determine the correlation signals in a form:

$$y_i(n) = \sum_{k=0}^{P-1} x(n-k)r(n-k),$$

where $y_i(n)$, $i=1,2$, represents the correlation signals, n is a time index n an integer, k is a shift index having values of 0 to P-1 where P is a period determined by a predetermined tone frequency and a predetermined sampling rate, $x(n-k)$ is a generated tone and $r(n-k)$ is the received signal.

FIG. 3, numeral 300, is a flow chart showing steps of a dual-correlation phase reversal detection method for determining phase reversal in a received signal in accordance with the present invention. A) generating, by a tone generator, two predetermined tones with a phase difference of $\pi/2$ (309); B) utilizing first and second correlators for providing a first and a second correlation signal, respectively, (304); C) utilizing first and second zero-crossing detectors for determining a zero-crossing for the first and second correlation signals, respectively, (306); and D) utilizing a decision unit for detecting phase reversal when, upon one correlation signal having a first zero crossing, the other correlation signal has a zero crossing within a predetermined time interval from the first zero crossing (308).

FIG. 4, numeral 400, is a flow chart showing the steps of determining the first and second correlation signals of FIG. 3 with greater particularity. A) determining the first correlation signal by utilizing a first multiplier for multiplying the received signal and the first predetermined tone to provide first product signals and utilizing a first summer for summing a predetermined number of first product signals to provide the first correlation signal (402); and B) determining the second correlation signal by utilizing a second multiplier for multiplying the received signal and the second predetermined tone to provide second product signals and utilizing a second summer for summing a predetermined number of second product signals to provide the second correlation signal (404). Again, the correlation signals are determined in a form:

$$y_i(n) = \sum_{k=0}^{P-1} x(n-k)r(n-k),$$

as described more fully above.

In an exemplary implementation, the present invention may be utilized in a V.34 modem, for example, for identification a 2100 Hz tone or a 2100 Hz tone amplitude-modulated by a 15 Hz tone with a modulation index of 20 percent. Periodic phase reversals in both signals require that the receiving modem employ a phase reversal detector. Utilizing a coherent type phase reversal detector would require coherent demodulation, requiring use of a phase-lock loop, thus significantly increasing complexity. A phase reversal detector is also necessary for a time marker. The dual-correlation phase reversal detector of the present invention provides non-complex phase reversal detection.

For example, the dual-correlation phase reversal detector of the present invention typically generates two local tones of 2100 Hz, wherein the phases differ by $\pi/2$. The two local tones are separately multiplied by the received signal. In one embodiment 24 samples, i.e., one period of the 2100 Hz tone using a sampling rate of 7200 bits/second, of each of the two multiplied received signals are summed to form two correlation signals. The two correlation signals are each sent to a zero-crossing detector, the output of which is sent to a decision unit. Where both correlation signals have zero crossings within a predetermined time, generally almost simultaneously, the decision unit detects a phase reversal. That is, in a frequency shift-free case, the two correlation signals are flat, and at least one of the correlation signals is at least a predetermined d stance from zero. Where phase reversal occurs, both correlation signals change sign substantially simultaneously or alternatively, where there is noise, within a predetermined delay period that encompasses a predetermined small number of samples.

Where there is a slow frequency shift, the two correlation signals change sign over a long period instead of simultaneously. Thus, when one correlation signal has a zero crossing, the other correlation signal is at a position approximately furthest from zero, and a sign change due to the second correlation signal is highly unlikely. Thus, the dual-correlation phase reversal detector is relatively immune from declaring phase reversal due to slow frequency shifting.

Although an exemplary embodiments is described above, it will be obvious to those skilled in the art that many alterations and modifications may be made without departing from the invention. Accordingly, it is intended that all such alterations and modifications be included within the spirit and scope of the invention as defined in the appended claims.

I claim:

1. A dual-correlation phase reversal detector for determining phase reversal in a received signal, comprising:
    A) a tone generator for generating a first predetermined tone and a second predetermined tone with a phase difference of $\pi/2$ with respect to the first predetermined tone,
    B) first and second correlators, each operably coupled to receive the received signal and to the tone generator, for the first correlator correlating the first predetermined tone with the received signal and the second correlator correlating the second predetermined tone with the received signal, to provide a first correlation signal and a second correlation signal, respectively,
    C) first and second zero-crossing detectors, operably coupled to the first and second correlators, respectively, for determining a zero-crossing for the first and second correlation signals, respectively, and
    D) a decision unit, operably coupled to the first and second zero-crossing detectors, for detecting phase reversal when, upon one correlation signal having a first zero crossing, the other correlation signal having a zero crossing within a predetermined time interval from the first zero crossing.

2. The dual-correlation phase reversal detector of claim 1 wherein:
    A) the first correlator comprises:
        1) a first multiplier, operably coupled to the tone generator and to receive the received signal, for multiplying the received signal and the first predetermined tone to provide first product signals;
        2) a first summer, operably coupled to the first multiplier, for summing a predetermined number of first product signals to provide the first correlation signal; and
    B) the second correlator comprises:
        1) a second multiplier, operably coupled to the tone generator and to receive the received signal, for multiplying the received signal and the second predetermined tone to provide second product signals;
        2) a second summer, operably coupled to the second multiplier, for summing a predetermined number of second product signals to provide the second correlation signal.

3. The dual-correlation phase reversal detector of claim 2 wherein each of the first and second correlators determines its corresponding correlation signal in a form:

$$y_i(n) = \Sigma_{k=0}^{P-1} x(n-k) r(n-k),$$

where $y_i(n)$, i=1,2, represents the correlation signals, n is a time index, n is an integer, k is a shift index having values of 0 to P−1 where P is a period determined by a predetermined tone frequency and a predetermined sampling rate, $x(n-k)$ is a generated tone and $r(n-k)$ is the received signal.

4. A dual-correlation phase reversal detection method for determining phase reversal in a received signal, comprising the steps of:
    A) generating, by a tone generator, a first predetermined tone and a second predetermined tone with a phase difference of $\pi/2$ between the first predetermined tone and the second predetermined tone,
    B) utilizing first and second correlators for providing a first correlation signal and a second correlation signal, respectively,
    C) utilizing first and second zero-crossing detectors for determining a zero-crossing for the first correlation signal and a zero crossing for the second correlation signal, respectively, and
    D) utilizing a decision unit for detecting phase reversal when, upon one correlation signal having a first zero crossing, the other correlation signal has a zero crossing within a predetermined time interval from the first zero crossing.

5. The dual-correlation phase reversal method of claim 4 wherein the step of utilizing first and second correlators for providing a first correlation signal and a second correlation signal, respectively, includes:
    A) determining the first correlation signal by utilizing a first multiplier for multiplying the received signal and a first predetermined tone to provide first product signals and utilizing a first summer for summing a predetermined number of first product signals to provide the first correlation signal; and B) determining the second correlation signal by utilizing a second multiplier for multiplying the received signal and a second predetermined tone to provide second product signals and utilizing a second summer for summing a predetermined number of second product signals to provide the second correlation signal.

6. The dual-correlation phase reversal detection method of claim 5 further including a step of determining the correlation signals in a form:

$$y_i(n) = \sum_{k=0}^{P-1} x(n-k)r(n-k),$$

where $y_i(n)$, i=,2, represents the correlation signals, n is a time index, n is an integer, k is a shift index having values of 0 to P−1 where P is period determined by a predetermined tone frequency and a predetermined sampling rate, $x(n-k)$ is a generated tone and $r(n-k)$ is the received signal.

* * * * *

UNITED STATES PATENT AND TRADEMARK OFFICE
CERTIFICATE OF CORRECTION

PATENT NO. : 5,528,632
DATED : June 18, 1996
INVENTOR(S) : Jingdong Lin

It is certified that error appears in the above-indentified patent and that said Letters Patent is hereby corrected as shown below:

Column 6. line 6 (i=,2,) should be $\underline{i=1,2,}$

Signed and Sealed this

Seventeenth Day of September, 1996

Attest:

BRUCE LEHMAN

Attesting Officer    Commissioner of Patents and Trademarks